United States Patent
Yamada

(10) Patent No.: US 10,088,043 B2
(45) Date of Patent: Oct. 2, 2018

(54) SHIFT RANGE CONTROL APPARATUS

(71) Applicant: DENSO CORPORATION, Kariya, Aichi-pref. (JP)

(72) Inventor: Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/492,324

(22) Filed: Apr. 20, 2017

(65) Prior Publication Data
US 2017/0307074 A1    Oct. 26, 2017

(30) Foreign Application Priority Data

Apr. 26, 2016  (JP) .................................. 2016-88294

(51) Int. Cl.
*H02P 25/08* (2016.01)
*F16H 61/32* (2006.01)
*H02P 6/16* (2016.01)
*H02P 29/024* (2016.01)
*F16H 61/12* (2010.01)

(52) U.S. Cl.
CPC ............. *F16H 61/32* (2013.01); *F16H 61/12* (2013.01); *H02P 6/16* (2013.01); *H02P 29/027* (2013.01); *F16H 2061/1208* (2013.01); *F16H 2061/1268* (2013.01); *F16H 2061/326* (2013.01)

(58) Field of Classification Search
CPC .............. F16H 61/32; F16H 2061/247; F16H 2061/326; H02K 11/215; H02P 25/0805
USPC ....................................... 318/254.1
See application file for complete search history.

(56) References Cited

U.S. PATENT DOCUMENTS

| | | | | |
|---|---|---|---|---|
| 4,019,107 A * | 4/1977 | Dixon | .................. | H02P 7/2985 318/432 |
| 4,094,385 A * | 6/1978 | Maeda | ...................... | B66B 1/50 187/291 |
| 4,277,735 A * | 7/1981 | Okuyama | ..................... | 318/766 |
| 5,469,215 A * | 11/1995 | Nashiki | ..................... | H02P 6/10 318/432 |
| 5,574,349 A * | 11/1996 | Oh | ........................ | G11B 15/467 318/601 |
| 2003/0222617 A1 * | 12/2003 | Nakai | .................... | F16H 61/32 318/701 |
| 2006/0207373 A1 | 9/2006 | Amamiya et al. | | |
| 2007/0293992 A1 * | 12/2007 | Kuwahara | ........... | F02D 41/1497 701/1 |

(Continued)

*Primary Examiner* — Eduardo Colon Santana
*Assistant Examiner* — Gabriel Agared
(74) *Attorney, Agent, or Firm* — Nixon & Vanderhye PC

(57) ABSTRACT

A PWM control part rotationally drives a motor based on a PWM control value. A rotation speed control part controls a rotation speed of the motor. A rotation angle detection part detects a rotation angle of the motor. A reference position learning part controls the motor to rotate at a constant rotation speed until a detent plate stops at a limit position of a movable range and learns a reference position of the motor. A current detection circuit detects a current value corresponding to a driving current. A current limitation part limits a current supplied to the motor. A PWM control value limitation part controls the PMW control value to be equal to or smaller than a PWM limitation value, which is a predetermined value. A relation check part checks whether a relation between a current value detected by the current detection circuit and the PWM control value is inappropriate.

9 Claims, 10 Drawing Sheets

(56) References Cited

U.S. PATENT DOCUMENTS

| | | | |
|---|---|---|---|
| 2008/0168853 A1 | 7/2008 | Amamiya et al. | |
| 2008/0210033 A1 | 9/2008 | Amamiya et al. | |
| 2011/0238272 A1* | 9/2011 | Kato | B60W 10/06 701/55 |
| 2014/0039742 A1* | 2/2014 | Tanaka | B60L 11/007 701/22 |
| 2014/0145665 A1* | 5/2014 | Shouji | B60L 15/025 318/503 |
| 2016/0118916 A1* | 4/2016 | Gohara | H02P 6/008 318/400.13 |

* cited by examiner

SHIFT RANGE CONTROL APPARATUS

CROSS REFERENCE TO RELATED APPLICATION

The present application is based on Japanese patent application No. 2016-88294 filed on Apr. 26, 2016, the whole contents of which are incorporated herein by reference.

FIELD

The present disclosure relates to a shift range control apparatus.

BACKGROUND

A conventional shift range control apparatus switches over a shift range by controlling a motor of a shift range switchover device in response to a shift range switchover request from a driver. For example, in a shift range switchover device disclosed in JP 2004-308752A (US 2008/0168853A1, US 2008/0210033A1, US 2006/0207373A1), a switched reluctance motor (SR motor) is used as a motor for a drive power source.

The shift range control apparatus according to JP 2004-308752A performs a reference position learning control for learning a reference position of a motor by rotating the motor until a detent plate, which is a driven target of the motor, stops at a limit position in a movable range before starting a normal driving control of the motor. By learning the reference position, the limit position and the reference position of the motor are matched so that the motor may be rotated to a target rotation position by the normal driving control.

When the reference position learning control is performed, the detent plate or a roller of a detent spring hits a wall, which corresponds to the limit position in the movable range. Since inertia torque of the motor at this time is a load to a wall in respect to designing strength of the motor, it is desired to control a rotation speed of the motor to a low rotation speed so that the detent plate hits the wall at low speed. In the shift range control apparatus described above, the rotation speed of the motor is lowered by shortening an ON period of a current supply command pulse applied to the motor in performing the reference position learning control. In case that an SR motor is used as a motor for the driving power source of the shift range switchover device, torque of the motor will not increase even when the motor stops rotation after hitting the wall in performing the reference position learning control.

In place of the SR motor for the shift range switchover device, a DC brushless motor, which has a good response characteristic, is proposed to be used. In case that the DC brushless motor is used as the motor for the shift range switchover device, torque of the motor will increase when the motor stops rotation after hitting the wall in performing the reference position learning control. For this reason, it is required to limit the torque of the motor, that is, a driving current supplied to the motor. In case that the driving current is not detected because of a detection circuit failure or the like, it is not possible to limit the torque of the motor appropriately.

SUMMARY

It is therefore an object to provide a shift range control apparatus, which is capable of limiting torque of a motor in performing a reference position learning control.

According to one aspect, a shift range control apparatus provided for switching over a shift range by controlling a shift range switchover device, which includes a motor and a driven target rotationally driven by torque of the motor, comprises a PWM control part, a rotation speed control part, a rotation angle detection part, a reference position learning part, a current detection part, a current limitation part, a PWM control value limitation part and a relation check part. The PWM control part rotationally drives the motor based on a PWM control value, which is a control value for controlling the motor by pulse-width modulation. The rotation speed control part controls a rotation speed of the motor by the PWM control part. The rotation angle detection part detects a rotation angle of the motor. The reference position learning part controls the motor to rotate at a constant rotation speed by the rotation speed control part until the driven target stops at a limit position in a movable range, and learns a reference position of the motor based on the rotation angle detected by the rotation angle detection part when the motor stops rotation. The current detection part detects a current value corresponding to a driving current supplied when the motor is driven. The current limitation part limits a current supplied to the motor so that the current value detected by the current detection circuit is limited to be equal to or smaller than a predetermined current limitation value. The PWM control value limitation part limits the PWM control value to be equal to or smaller than a predetermined PWM limitation value. The relation check part checks whether a relation between the current value detected by the current detection circuit and the PWM control value is inappropriate.

DETAILED DESCRIPTION OF THE EMBODIMENT

Figure 1:
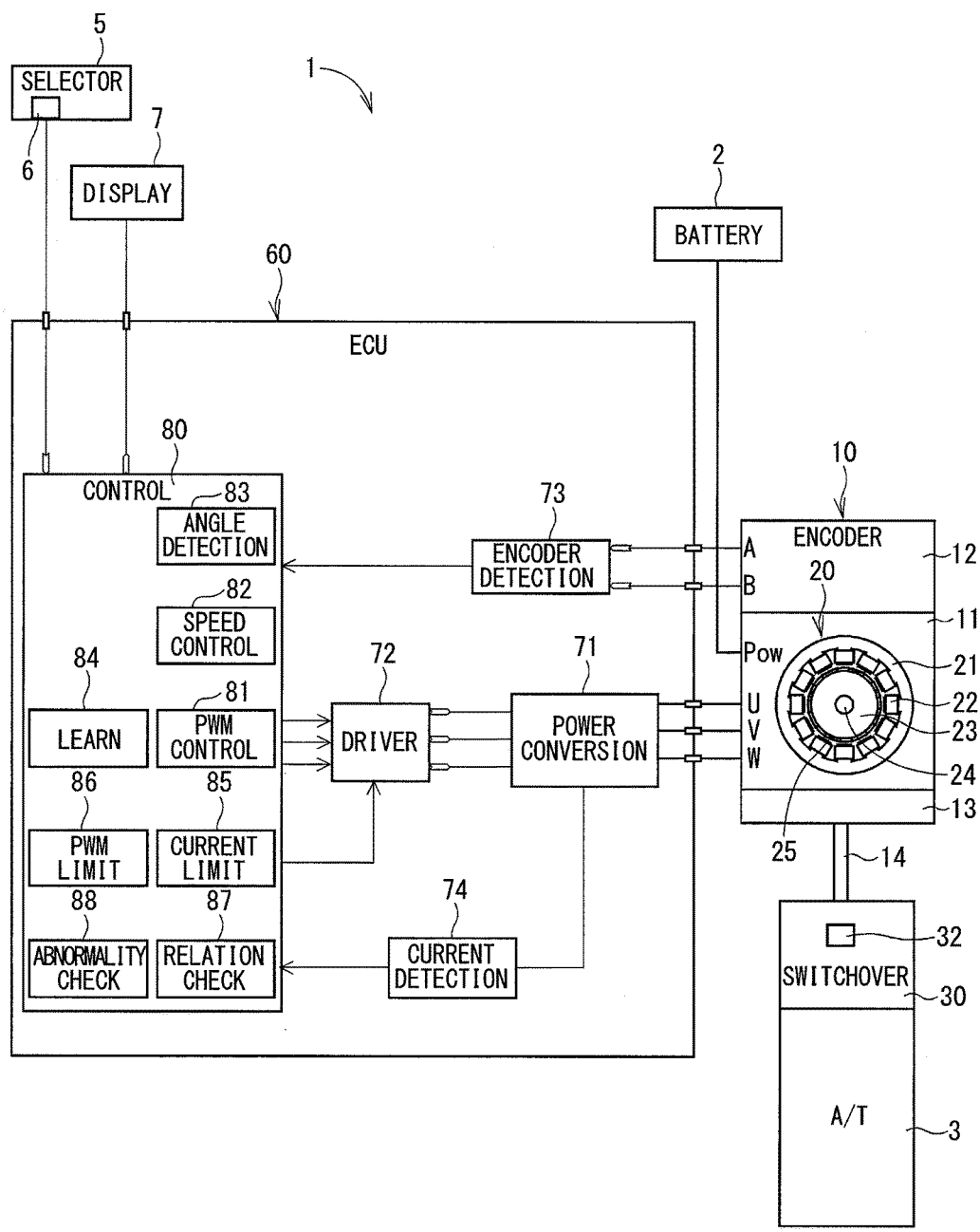
FIG. 1 is a schematic diagram showing a shift range control apparatus according to a first embodiment and a shift-by-wire system using the shift range control apparatus.

A shift range control apparatus will be described with reference to embodiments shown in the accompanying drawings. Substantially the same structural parts are designated with the same reference numerals and signs among the embodiments thereby to simplify description.

First Embodiment

Referring first to FIG. 1, a shift-by-wire system, which uses a shift range control apparatus according to a first embodiment, is designated with reference numeral 1.

The shift-by-wire system 1 includes a shift range switchover device 30, an electronic control unit (ECU) 60, which is a shift range control apparatus, and the like. The shift-by-wire system 1 is mounted on a vehicle together with an automatic transmission (A/T) 3, for example, to switchover a shift range of the automatic transmission 3 via a wire control by driving an actuator 10 of the shift range switchover device 30 in response to a command from a driver of the vehicle. The actuator 10 includes a housing 11, a motor 20, an encoder 12, a reduction device 13, an output shaft 14 and the like. The motor 20 is a DC brushless motor, which is for example a three-phase driven type. The motor 20 includes a stator 21, coils 22, a rotor 23, a motor shaft 24, magnets 25 and the like.

The stator 21 is formed in a ring shape by stacking plural iron plates, for example, and accommodated in a manner fixed to an inside wall of the housing 11. The stator 21 has plural salient poles, which are spaced apart equi-angularly in a circumferential direction and protruded in a radially inner direction. The coils 22 are wound about the salient poles of the stator 21. Each coil 22 corresponds to either one of plural phases (U-phase, V-phase and W-phase) of the motor 20. The rotor 23 is formed in a disk shape by stacking plural iron plates for example and provided rotatably in the stator 21.

The motor shaft 24 is fixed to the rotor 23 in the center of the rotor 23 and rotatable with the rotor 23. The motor shaft 24 is supported rotatably by the housing 11. The rotor 23 is thus rotatable with the motor shaft 24 inside the stator 21. The magnets 25 are fixed to an outer wall of the rotor 23 in a manner to face the salient poles of the stator 21. The magnets 25 are provided in a circumferential direction of the rotor 23 to provide opposite magnetic poles (N-pole and S-pole) alternately. By switching over current supply to the coil 22 of each phase, the stator 21 generates a rotating magnetic field to rotate the rotor 23. Since the motor 20 is the DC brushless motor as described above, it has a relatively high response characteristic. The motor 20 thus rotates with power supply from a battery 2 provided as an electric power source in the vehicle.

The ECU 60 controls driving of the motor 20 by switching over power supply from the battery 2 to the coil 22 of each phase.

The encoder 12 is provided in the housing 11 of the actuator 10. The encoder 12 is formed of a magnet, a magnetism detecting Hall IC and the like. The magnet is rotatable with the rotor 23. The Hall IC is mounted on a substrate, which is fixed to the housing 11, and located to face the magnet for detecting passing of a magnetic flux generating part of the magnet. The encoder 12 outputs an A-phase pulse signal and a B-phase pulse signal in correspondence to change in a rotation angle of the motor 20 (rotor 23). The encoder 12 is an incremental type encoder.

The reduction device 13 transfers rotation of the motor 20 to the shift range switchover device 30 after reducing a rotation speed of the motor shaft 24. The shift range switchover device 30 transfers a rotary driving force outputted from the reduction device 13 to a manual valve 4 and a parking lock mechanism 50, which are shown in FIG. 2.

Figure 2:
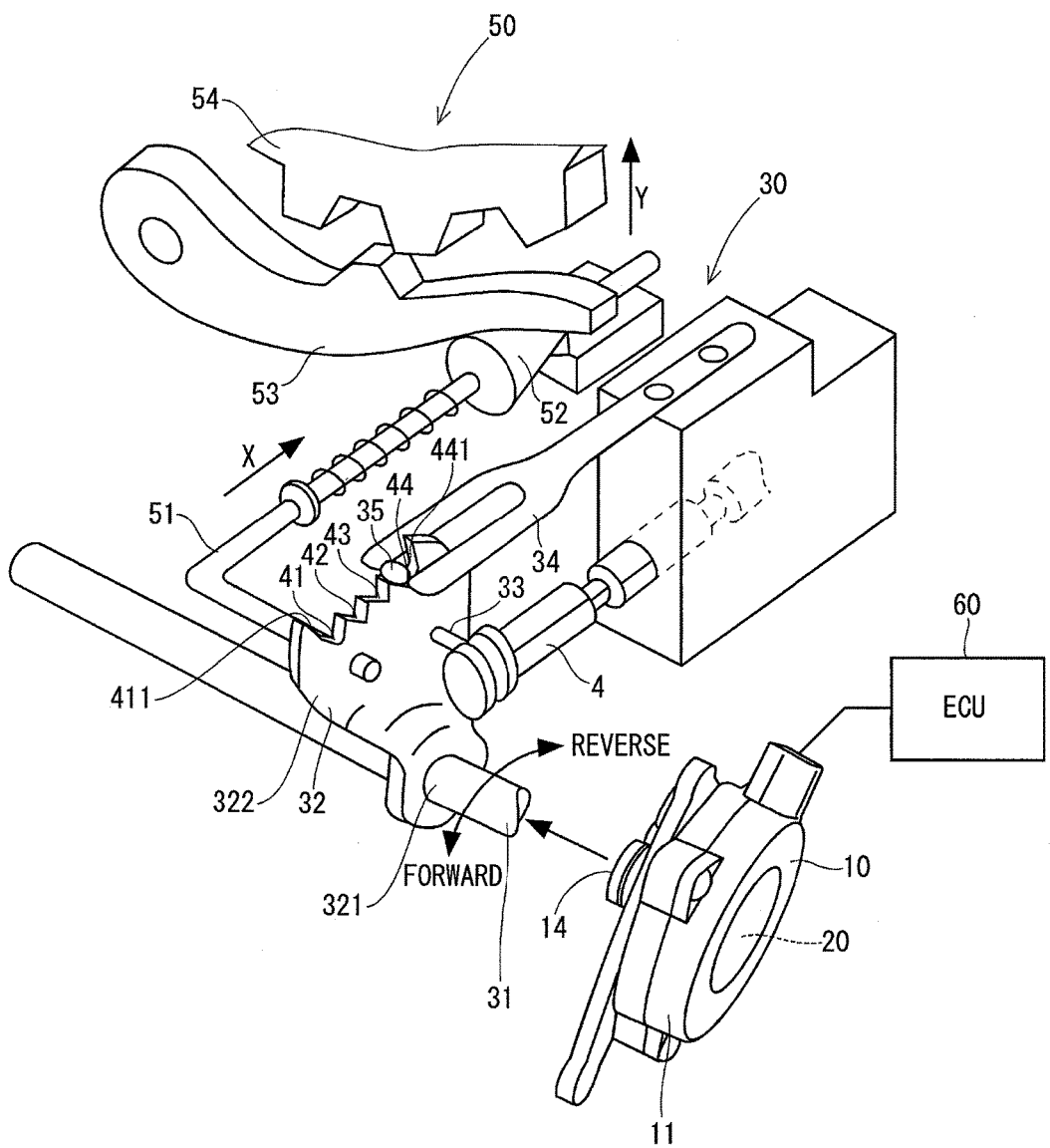
FIG. 2 is a perspective view showing a shift range switchover device, to which the shift range control apparatus according to the first embodiment is applied.
Figure 3:
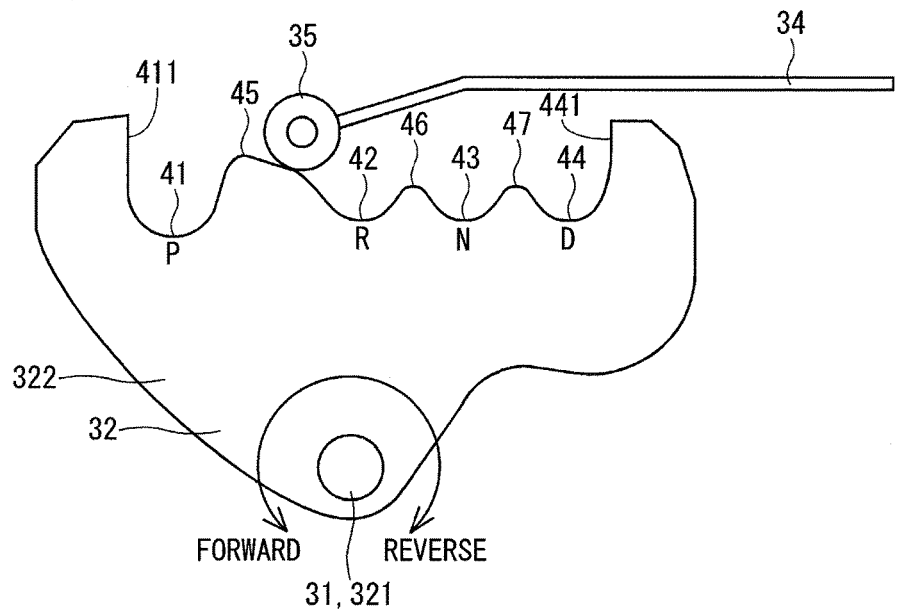
FIG. 3 is a schematic view showing a driven target of a motor of the shift range switchover device shown in FIG. 2.

As shown in FIG. 2, the shift range switchover device 30 includes the actuator 10, a manual shaft 31, a detent plate 32, which is a driven target, a detent spring 34 and the like. The manual shaft 31 is connected to the output shaft 14 of the actuator 10 and rotationally driven by a rotary torque of the motor 20. The detent plate 32 includes a detent shaft 321, a plate part 322, recessed parts 41, 42, 43, 44 and protruded parts 45, 46, 47, which are shown in FIG. 3.

The detent shaft 321 is formed coaxially and integrally with the manual shaft 31. The torque of the actuator 10, that is, motor 20, is thus applied to the detent shaft 321 through the manual shaft 31. The detent shaft 321 is therefore rotationally driven with the manual shaft 31 by the torque transferred from the motor 20.

The plate part 322 is formed integrally with the detent shaft 321 and in a generally fan shape, which extends in a radially outward direction from the detent shaft 321. The plate part 322 is thus rotationally driven with the manual shaft 31 and the detent shaft 321 by the motor 20.

A pin 33 is fixed to the plate part 322 in a manner to protrude in generally parallel with the manual shaft 31. The pin 33 is connected to the manual valve 4. As a result, when the detent plate 32 rotates with the manual shaft 31, the manual valve 4 moves reciprocally in an axial direction. That is, the shift range switchover device 30 converts the rotary driving force of the actuator 10 to a linear movement and transfers it to the manual valve 4.

The recessed parts 41, 42, 43 and 44 are formed to be concave from an outer peripheral part toward the detent shaft 321. The recessed part 41 is formed at one circumferential side of the detent plate 32. The recessed part 44 is formed in the other circumferential side of the detent plate 32. The recessed parts 42 and 43 are formed between the recessed part 41 and the recessed part 44. A protruded part 45 is formed between the recessed part 41 and the recessed part 42. A protruded part 46 is formed between the recessed part 42 and the recessed part 43. A protruded part 47 is formed between the recessed part 43 and the recessed part 44.

In the first embodiment, the recessed parts 41 to 44 are formed in correspondence to different shift ranges of the automatic transmission 3. Specifically, the recessed part 41 is formed in correspondence to a parking range (P-range, P). The recessed part 42 is formed in correspondence to a reverse range (R-range, R). The recessed part 43 is formed in correspondence to a neutral range (N-range, N). The recessed part 44 is formed in correspondence to a drive range (D-range).

The detent spring 34 is formed resiliently and has a roller 35 as a restricting part at its longitudinal end. The detent spring 34 normally biases the roller 35 toward the detent shaft 321. Thus the roller 35 is pressed to the outer peripheral part of the plate part 322.

When a certain rotary force is applied from the motor 20 to the detent plate 32 in the rotation direction through the manual shaft 31, the roller 35 overrides one of the protruded parts 45, 46 and 47 formed between the recessed parts 41, 42, 43 and 44 and moves to the adjacent one of the recessed part 41, 42, 43 or 44. By thus rotating the manual shaft 31 by the actuator 10, the axial position of the manual valve 4 and a state of the parking lock mechanism 50 are varied thereby to switchover the shift range of the automatic transmission 3. When the roller 35 rides over each of the protruded parts 45, 46 and 47, the detent spring 34 resiliently deforms. At this time, the roller 35 passes the recessed part 41, 42, 43 or 44 and the protruded parts 45, 46 and 47 while rolling.

When the roller 35 fits in any one of the recessed parts 41, 42, 43 and 44 and restricts the detent plate 32 from rotating, the axial position of the manual valve 4 and the state of the parking lock mechanism 50 are fixed. Thus the shift range of the automatic transmission 3, that is, a range position is fixed. As described above, the detent plate 32 and the roller 35 operate as a detent mechanism.

In the first embodiment, a direction of rotation of the output shaft 14 of the actuator 10, which switches over the shift range from the P-range side to the R-range, N-range and D-range side as shown in FIG. 2, is assumed to be a forward rotation direction. A direction of rotation of the output shaft 14 of the actuator 10, which switches over the shift range from the D-range side to the N-range, R-range and P-range side, is assumed to be a reverse rotation direction.

As shown in FIG. 3, the recessed part 41, which corresponds to the P-range, has a P-wall 411, which is opposite to the protruded part 45. The recessed part 44, which corresponds to the D-range, has a D-wall 441, which is opposite to the protruded part 47. The P-wall 411 and the D-wall 441 are formed generally in parallel to each other and higher than the protruded parts 45, 46 and 47. For this reason, even when the detent plate 32 rotates in the reverse rotation direction, the roller 35 is not allowed to pass over the P-wall 411 and maintained in contact with the P-wall 411 thereby restricting the rotation of the detent plate 32 in the reverse rotation direction. In the similar manner, even when the detent plate 32 rotates in the forward rotation direction, the roller 35 is not allowed to pass over the D-wall 441 and maintained in contact with the D-wall 441 thereby restricting the rotation of the detent plate 32 in the forward rotation direction. Thus, a movable range of the detent plate 32 corresponds to a relatively movable range of the roller 35 between the P-wall 411 and the D-wall 441.

FIG. 2 shows the state of the parking lock mechanism 50 in a case that the shift range is the D-range, that is, a range other than the P-range. In this state, a parking gear 54 is not locked by a parking lock pawl 53. As a result, rotation of wheels of the vehicle is not restricted. When the output shaft 14 of the actuator 10 is rotated in the reverse rotation direction from this state, a rod 51 fixed to the detent plate 32 is pushed through the detent plate 32 in an arrow direction X shown in FIG. 2. A tapered part 52 formed at the longitudinal end of the rod 51 pushes up the parking lock pawl 53 in an arrow direction Y shown in FIG. 2. As a result, the parking lock pawl 53 is meshed with the parking gear 54 to lock the parking gear 54. Thus the rotation of the wheels of the vehicle is restricted. Under this state, the roller 35 of the detent spring 34 remains fitted in the recessed part 41 of the detent plate 32. That is, the roller 35 is positioned in the center of the recessed part 41 and the actual range of the automatic transmission 3 is set in the P-range.

The ECU 60 will be described next in detail. The ECU 60 is a small-sized computer, which includes a central processing unit (CPU) as an arithmetic operation unit, a RAM and a ROM as memories, other circuits and input/output circuits. The ECU 60 operates to control various apparatuses and devices by execution of various programs stored in the ROM and the like in accordance with sensor signals outputted from various sensors mounted on the vehicle and various data stored in the ROM and RAM. The ECU 60 is connected electrically to the battery 2, which is the power supply source in the vehicle, to operate with electric power supplied from the battery 2. Each processing of the ECU 60 may be software processing performed by execution of programs pre-stored in the memory such as the ROM or hardware processing performed by dedicated electronic circuits.

As shown in FIG. 1, the ECU 60 includes a power conversion circuit 71, a driver circuit 72, an encoder detection circuit 73, a current detection circuit 74, a control circuit 80 and the like. The power conversion circuit 71 is an inverter, for example, which includes plural switching elements such as MOSFETs. In the first embodiment, six switching elements are used. Two of the six switching elements form one pair of switching elements. That is, the switching elements provide three switching element pairs. The three switching element pairs are provided in correspondence to three phases of coils 22 of the motor 20, respectively. The three switching element pairs are connected to coils 22 of U-phase, V-phase and W-phase, respectively.

The driver circuit 72 is connected to a gate terminal of each switching element of the power conversion circuit 71. The driver circuit 72 turns on the switching element by applying an on-signal (driving signal) to the gate terminal of the switching element. With the on-signal at the gate terminal, the switching element remains in an on-state. The switching element remains in an off-state when no on-signal is applied to the gate terminal.

The encoder detection circuit 73 is connected to the encoder 12. The encoder 12 outputs to the encoder detection circuit 73 pulse signals of A-phase and B-phase, which vary with the rotation angle, that is, angular position, of the motor 20 (rotor 23). The control circuit 80 detects the pulse signals of the encoder 12, which the encoder detection circuit 73 detected.

As described above, the encoder 12 is the incremental type, which outputs the pulse signal in response to the rotation of the motor 20. The control circuit 80 decreases (counts down) or increases (counts up) a count value (pulse signal count value) in response to the pulse signal outputted from the encoder 12. Thus the control circuit 80 detects a rotation state of the motor 20 (rotor 23). The control circuit 80 is capable of rotating the motor 20 at high rotation speeds without loss of synchronism by detecting the rotation state of the motor 20. Each time the power supply is turned on in the vehicle, that is, each activation of the shift-by-wire system 1, initial driving control is performed for learning a current supply phase of the motor 20, that is, synchronization between the current supply phase and the count value of the pulse signals outputted from the encoder 12. With this initial driving control, the rotation of the actuator 10 is controlled appropriately.

The current detection circuit 74, which operates as a current detection part, is connected to the power conversion circuit 71, for example, to detect currents flowing in the coils 22 and each of the switching elements of the power conversion circuit 71. That is, the current detection circuit 74 detects a current value, which corresponds to a driving current supplied when the motor 20 is driven. The current detection circuit 74 outputs a signal related to the detected current value to the control circuit 80.

The control circuit 80 is an integrated circuit such as a programmed microcomputer, for example. The control circuit 80 includes, as conceptual functional parts, a PWM control part 81, a rotation speed control part 82, a rotation angle detection part 83, a reference position learning part 84, a current limitation part 85, a PWM (pulse-width modulation) control value limitation part 86, a relation check part 87 and an abnormality check part 88. In the first embodiment, those functional parts 81 to 88 are realized by computer programs executed by the CPU of the microcomputer.

The PWM control part 81 detects a rotation position of the rotor 23 based on the pulse signals from the encoder detection circuit 73, calculates a PWM control value as a control value for PWM control of the motor 20 based on the detected rotation position and the like, and outputs the PWM control value to the driver circuit 72. The driver circuit 72 calculates the driving signal based on the PWM control value applied from the PWM control part 81 and outputs the calculated driving signal to each switching element of the power conversion circuit 71. Thus the on-off state of each switching element of the power conversion circuit 71 is controlled in correspondence to the driving signal.

The PWM control part 81 rotationally drives the motor 20 through the driver circuit 72 and the power conversion circuit 71 based on the calculated PWM control value. As the PWM control value applied to the driver circuit 72 increases, the driving current supplied to the motor 20 increases and the torque of the motor 20 increases. The rotation speed control part 82 variably controls the rotation speed of the motor 20 by controlling the PWM control value applied from the PWM control part 81 to the driver circuit 72. The rotation angle detection part 83 detects a present rotation angle, which is the rotation angular position of the motor 20 at present time. Specifically, the rotation angle detection part 83 detects the present rotation angle of the motor 20 based on the count value of the pulse signals applied from the encoder 12. The ECU 60 is connected electrically to a selector sensor 6 of the range selector 5 provided as a shift selection device.

The selector sensor 6 detects a range, which is referred to as a command range below, commanded by manipulation of the driver of the vehicle on the range selector 5. The selector sensor 6 outputs the detected signal to the control circuit 80 of the ECU 60.

The control circuit 80 determines a target range based on the signal related to the command range outputted from the selector sensor 6. More specifically, the target range is determined based on the signal from the selector sensor 6, a brake signal, a vehicle speed sensor signal and the like. The ECU 60 controls the rotation of the actuator 10 so that the shift range of the automatic transmission 3 is set to the determined target range. That is, the shift range is switched over to the target range by rotating the motor 20 to the target rotation position, which corresponds to the target range. Thus actual range of the automatic transmission 3 is switched over to a range, which the driver intends to set.

Since the encoder 12 is the incremental type, it is only possible to detect a relative rotation position of the motor 20 (rotor 23). For this reason, in switching over the shift range to a desired range by rotating the motor 20, it is necessary to learn a reference position, which corresponds to an absolute position of the motor 20 and match a limit position of a movable range (rotatable range) of the detent plate 32 and the reference position. After learning the reference position of the motor 20, the rotation position of the motor 20 corresponding to each shift range is calculated based on the learned reference position and a predetermined rotation value (control constant) and the motor 20 is rotated to attain the calculated rotation position. Thus the actual range is switched over to the desired shift range. The reference position learning part 84 of the ECU 60 learns the reference position of the motor 20, which corresponds to the end part (P-range or D-range) in the movable range of the detent plate 32.

After learning the reference position by the reference position learning part 84, the control circuit 80 of the ECU 60 indirectly detects the actual range at that time by calculation based on the learned reference position, the predetermined rotation value and the pulse signal count value (rotation position of the motor 20) applied from the encoder 12. The ECU 60 indicates actual range information on a display device 7, which is provided at a front position relative to a driver's seat in the vehicle. The driver is thus enabled to recognize the actual range from time to time. The actual range is detected based on the rotation position of the motor 20, when the center of the roller 35 is located within respective ranges of the recessed part 41, 42, 43 and 44 of the detent plate 32, which correspond to the shift ranges P, R, N and D, respectively.

For learning the reference position, the reference position learning part 84 rotates the motor 20 until the detent plate 32 stops at the limit position in the movable range, that is, position corresponding to the P-range or D-range. At this time, the reference position learning part 84 controls the motor 20 to be rotated at a relatively low constant speed by the rotation speed control part 82. It is thus possible to reduce impact shock generated when the detent plate 32 reaches the limit position in the movable range. The reference position learning part 84 learns the reference position of the motor based on the count value of the pulse signals of the encoder 12 at time when a predetermined time elapses after the motor 20 stopped rotating.

The reference position learning part 84 learns the reference position of the motor 20 by rotating the motor 20 until the detent plate 32 stops at the limit position in the movable range. The control related to learning of the reference position by the reference position learning part 84 is referred to as a reference position learning control. For the reference position learning control, the motor 20 is rotated so that the roller 35 hits the P-wall 411 of the recessed part 41 corresponding to the P-range or the D-wall 441 of the recessed part 44 corresponding to the D-range. The reference position learning control is referred to as a wall-hitting learning control or a pushing learning control below occasionally as well.

The control circuit 80 normally drives the rotor 23 to the target rotation position by supplying electric power to the coils 22 of the motor 20 while detecting the rotation position of the rotor 23 relative to the stator 21 based on the pulse signal count value of the encoder 12. That is, the control circuit 80 switches over the shift range to the target range by driving the motor 20 to rotate while feeding back the rotation state of the rotor 23 (motor 20). This control of the control circuit 80 is referred to as a normal driving control.

The current limitation part 85 limits the current supplied to the motor 20 so that the current value detected by the current detection circuit 74 is limited to be equal to or smaller than a predetermined value. Specifically, the current limitation part 85 limits the current supplied to the motor 20 by controlling the driver 72 so that the current value detected by the current detection circuit 74 is limited to be equal to or smaller than the current limitation value. Thus the torque of the motor 20 is limited to be equal to or smaller than a predetermined value based on the current value detected by the current detection circuit 74.

The PWM control value limitation part 86 limits the PWM control value to be equal to or smaller than a PWM limitation value, which is a predetermined value. Specifically, the PWM control value limitation part 86 limits the PWM control value calculated by the PWM control part 81 to be equal to or smaller than the PWM limitation value. As a result, the PWM control value, which is limited by the PWM control value limitation part 86, is applied to the driver 72. Thus the torque of the motor 20 is limited to be equal to or smaller than the predetermined torque based on the PWM control value of the PWM control part 81. The relation check part 87 checks whether a relation between the current value detected by the current detection circuit 74 and the PWM control value is inappropriate, that is, abnormal. The abnormality check part 88 checks whether the current detection circuit 74 is abnormal based on a check result of the relation check part 87.

When the relation check part 87 determines that the relation between the current value detected by the current detection circuit 74 and the PWM control value is inappropriate, the abnormality check part 88 determines that the current detection circuit 74 is abnormal under a state that the voltage of the battery 2, which supplies the driving current to the motor 20, is equal to or larger than a predetermined voltage value.

Figure 4:
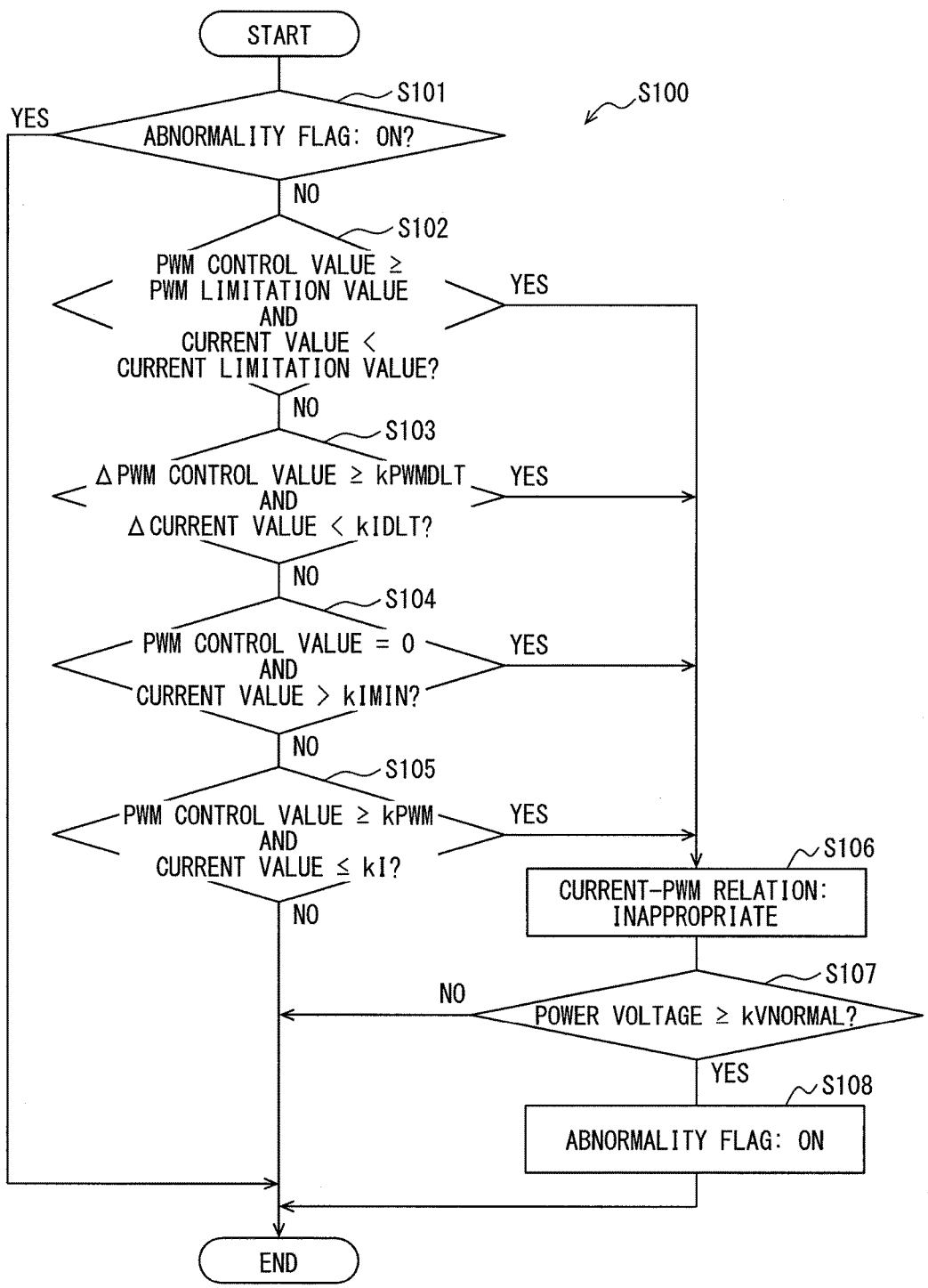
FIG. 4 is a flowchart showing processing executed by a control circuit of the shift range control apparatus according to the first embodiment.

The relation check part 87 and the abnormality check part 88 of the control circuit 80 perform relation check processing and abnormality check processing, respectively, as shown in FIG. 4. A series of processing S100 shown in FIG. 4 is executed by the relation check part 87 and the abnormality check part 88 of the control circuit 80. The processing S100 is started before the control of the motor 20 is started by the reference position learning part 84 and repeated during a period, in which the motor 20 is continuously controlled by the reference position learning part 84.

The control circuit 80 sets an abnormality flag, which indicates presence or absence of abnormality of the circuit 7, to OFF before the processing S100 is started for the first time. OFF of the abnormality flag indicates that the current detection circuit 74 is normal. ON of the abnormality flag indicates that the current detection circuit 74 is abnormal. After the processing S100, S101 is executed.

At S101, the control circuit 80 checks whether the abnormality flag is ON. When the abnormality flag is determined to be ON (S101: YES), S100 is finished. When the abnormality flag is determined to be not ON (S101: NO), that is, the flag is OFF, S102 is executed.

Immediately after the execution of the processing S100 for the first time, the abnormality flag is OFF and hence S102 is executed following S101. After the abnormality flag is set to ON, S101 results in YES and hence S102 and its subsequent steps are not executed.

At S102, the control circuit 80 checks whether the PWM control value is equal to or larger than a PWM limitation value and the current value detected by the current detection circuit 74 is smaller than a current limitation value. The PWM limitation value and the current limitation value are both predetermined values. The PWM limitation value is a limitation value used by the PWM control value limitation part 86. The current limitation value is a limitation value used by the current limitation part 85.

When it is determined that the PWM control value is equal to or larger than the PWM limitation value and the current value detected by the current detection circuit 74 is smaller than the current limitation value (S102: YES), S106 is executed. On the other hand, when it is determined that the PWM control value is smaller than the PWM limitation value or the current value detected by the current detection circuit 74 is equal to or larger than the current limitation value (S102: NO), S103 is executed.

Figure 5:
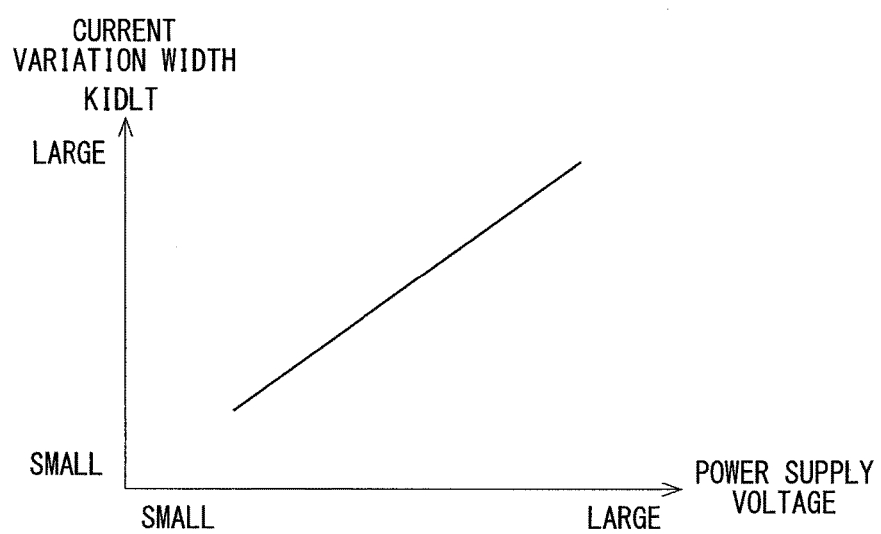
FIG. 5 is a graph showing a relation between a current variation width range and a power supply voltage, which is set in the processing of the control circuit of the shift range control apparatus according to the first embodiment.

At S103, the control circuit 80 checks whether a variation width ($\Delta$) of the PWM control value is equal to or larger than a PWM variation width kPWMDLT, which is predetermined, and a variation width ($\Delta$) of the current value detected by the current detection circuit 74 is smaller than a current variation width kILDT. The PWM variation width kPWMDLT is a predetermined value. The current variation width kILDT is also a predetermined value, which is set to increase in proportion to the power source voltage, that is, the voltage of the battery 2 as shown in FIG. 5. That is, the current variation width kILDT is corrected based on the voltage of the battery 2, which supplies the motor 20 with the driving current.

When it is determined that the variation width of the PWM control value is equal to or larger than the PWM variation width kPWMDLT and the variation width of the current value detected by the current detection circuit 74 is smaller than the current variation width kILDT (S103: YES), S106 is executed. On the other hand, when it is determined that the variation width of the PWM control value is smaller than the PWM variation width kPWMDLT or the variation width of the current value detected by the current detection circuit 74 is equal to or larger than the current variation width kILDT (S103: NO), S104 is executed. At S104, the control circuit 80 checks whether the PWM control value is 0 and the current value detected by the current detection circuit 74 is larger than a reference current value kIMIN. The reference current value kIMIN is a predetermined value.

When it is determined that the PWM control value is 0 and the current value detected by the current detection circuit 74 is larger than the reference current value kIMIN (S104: YES), S106 is executed. On the other hand, when it is determined that the PWM control value is not 0 or the current value detected by the current detection circuit 74 is equal to or smaller than the reference current value kIMIN (S104: NO), S105 is executed.

At S105, the control circuit 80 checks whether the PWM control value is equal to or larger than a PWM reference value kPWM and the current value detected by the current detection circuit 74 is equal to or smaller than the current reference value kI. The PWM reference value kPWM and the current reference value kI are both predetermined values.

When it is determined that the PWM control value is equal to or larger than the PWM reference value kPWM and the current value detected by the current detection circuit 74 is equal to or smaller than the current reference value kI (S105: YES), S106 is executed. On the other hand, when it is determined that the PWM control value is smaller than the PWM reference value kPWM or the current value detected by the current detection circuit 74 is larger than the current reference value kI (S105: NO), the processing S100 is finished. At S106, the control circuit 80 determines that the relation between the current value detected by the current detection circuit 74 and the PWM control value is inappropriate. Then S107 is executed. At S107, the control circuit 80 checks whether the voltage of the battery 2 is equal to or larger than a voltage value kVNORMAL. The voltage value kVNORMAL is a predetermined value.

When it is determined that the voltage of the battery 2 is equal to or larger than the voltage value kVNORMAL (S107: YES), S108 is executed. On the other hand, when it is determined that the voltage of the battery 2 is smaller than the voltage value kVNORMAL (S107: YES), S108 is executed. At S108, the control circuit 80 determines that the current detection circuit 74 is abnormal and sets the abnormality flag to ON. Then the processing S100 is finished.

As described above, the control circuit 80 functions as the relation check part 87 by especially executing S102 to S106. The control circuit 80 further functions as the abnormality check part 88 by especially executing S107 and S108. When the relation check part 87 determined that the relation between the current value detected by the current detection circuit 74 and the PWM control value is inappropriate and the abnormality check part 88 determines that the power supply voltage is equal to or larger than the predetermined voltage value, it is likely that the current detection circuit 74 is abnormal and caused the inappropriate relation. Thus the control circuit 88 determines that the current detection circuit 74 is abnormal.

The control circuit 80 controls the motor 20 by the processing of S100 as exemplarily shown in FIG. 6 to FIG. 10. In the following description, it is assumed that reference position learning is performed with the P-wall 411 as a reference position. Further, in FIG. 6 to FIG. 10, the rotation angle of the motor 20, which corresponds to the center of the recessed part 41 of the P-range, is referred to as a P-bottom.

Figure 6:
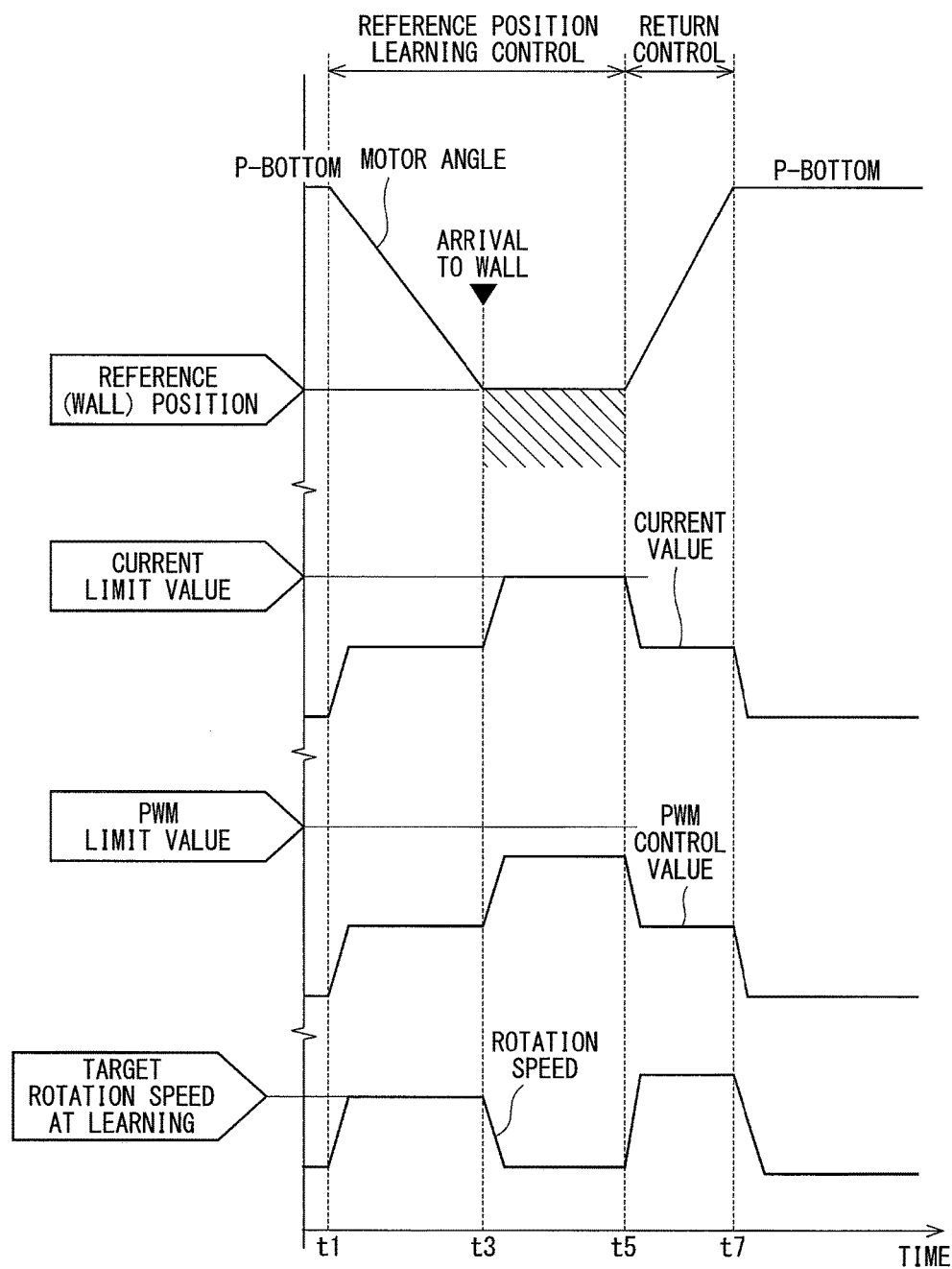
FIG. 6 is a time chart showing an exemplary control performed by the shift range control apparatus according to the first embodiment.

FIG. 6 shows one exemplary control performed by the control circuit 80 in case that the current detection circuit 74 is normal. When the motor 20 is started to be controlled by the reference position learning part 84 at time t1, the detent plate 32 is driven to rotate so that the roller 35 approaches the P-wall 411 from the position, which corresponds to the center of the recessed part 41. At this time, the rotation speed of the motor 20 is controlled by the rotation speed control part 82. The target rotation speed of the motor 20 at this time is set to a constant rotation speed, which is relatively low. Thus, during a period from t1 to t3, the motor 20 is rotated at the relatively low constant speed. For this reason, impact generated when the roller 35 touches the P-wall 411 at time t3 is reduced. As the motor 20 is driven after time t1, the driving current increases as the PWM control value increases, and the current value detected by the current detection circuit 74 correspondingly increases.

When the roller 35 arrives at the P-wall 411 at time t3, the detent plate 32 is restricted from rotating and the rotation speed of the motor 20 is decreased. At this time, the PWM control value further increases and the driving current further increases. The current limitation part 85 limits the driving current to be equal to or smaller than the current limitation value. Thus, in the reference position learning control, the torque of the motor 20 is limited to be equal to or smaller than the predetermined value when the motor 20 stops its rotation as a result of restriction of rotation of the detent plate 32. When a predetermined period elapses from time t3 at time t5, the reference position learning part 84 learns the reference position of the motor 20 and finishes the reference position learning control.

Since the abnormality check part 88 determines that the current detection circuit 74 is normal in the reference position learning control in the period from time t1 to time t5, the control circuit 80 limits the driving current by the current limitation part 85 without limiting the PWM control value by the PWM control value limitation part 86. Further, the control circuit 80 performs the return control at time t5 after the reference position learning control. Specifically, at time t5, the control circuit 80 reverses the direction of rotation of the motor 20 from the direction of rotation made during the period from time t1 to time t5 and drives the motor 20 to rotate in the reversed rotation direction. Thus, the detent plate 32 is driven rotationally so that the roller 35 returns to the position corresponding to the center of the recessed part 41 at time t7.

Figure 7:
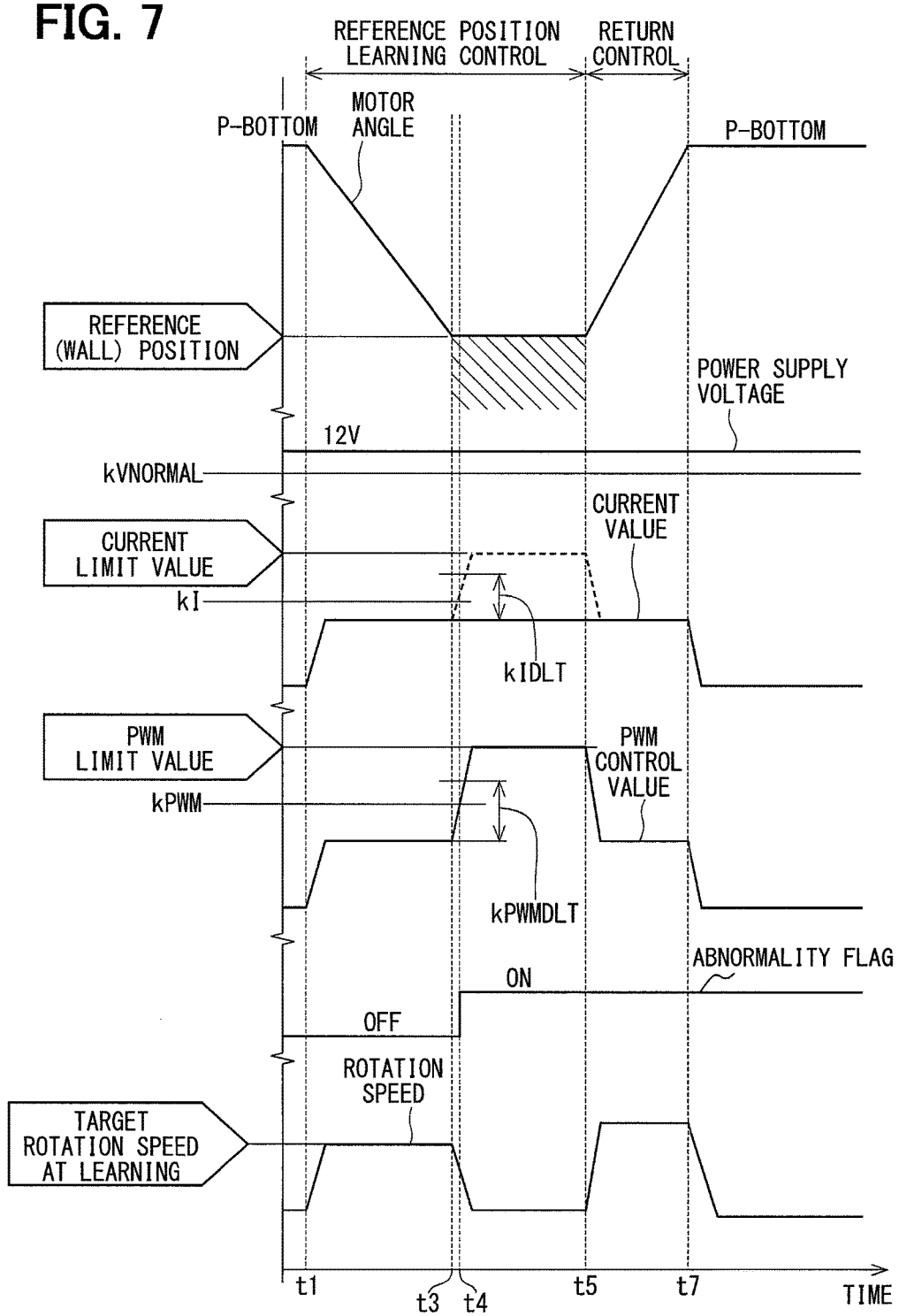
FIG. 7 is a time chart showing another exemplary control performed by the shift range control apparatus according to the first embodiment.

FIG. 7 shows another exemplary control performed by the control circuit 80 in case that the current detection circuit 74 is abnormal. Since the motor 20 is controlled in the same way until time t3 as when the current detection circuit 74 is normal (FIG. 6), no description is made. When the current detection circuit 74 has abnormality, the PWM control value increases after time t3 but the current value detected by the current detection circuit 74 remains the same as that before time t3.

When the PWM control value reaches the PWM reference value kPWM, it is determined at S105 that the PWM control value is equal to or larger than PWM reference value kPWM and the current value detected by the current detection circuit 74 is equal to or smaller than the current reference value kI. It is further determined at S106 that the relation between the current value detected by the current detection circuit 74 and the PWM control value is inappropriate. Since the power supply voltage, that is, voltage of the battery 2 is 12V and hence equal to or larger than the predetermined value kVNORMAL, it is determined at S108 that the current detection circuit 74 is abnormal. As a result, the abnormality flag is set to ON.

When it is determined at time t4 that the current detection circuit 74 is abnormal, the control circuit 80 limits the PWM control value by the PWM control value limitation part 86 without limiting the driving current by the current limitation part 85. For this reason, after time t4, the PWM control value is limited by the PWM control value limitation part 86. After time t5, since the motor 20 is controlled in the same way as when the current detection circuit 74 is normal (FIG. 6), no description is made.

Figure 8:
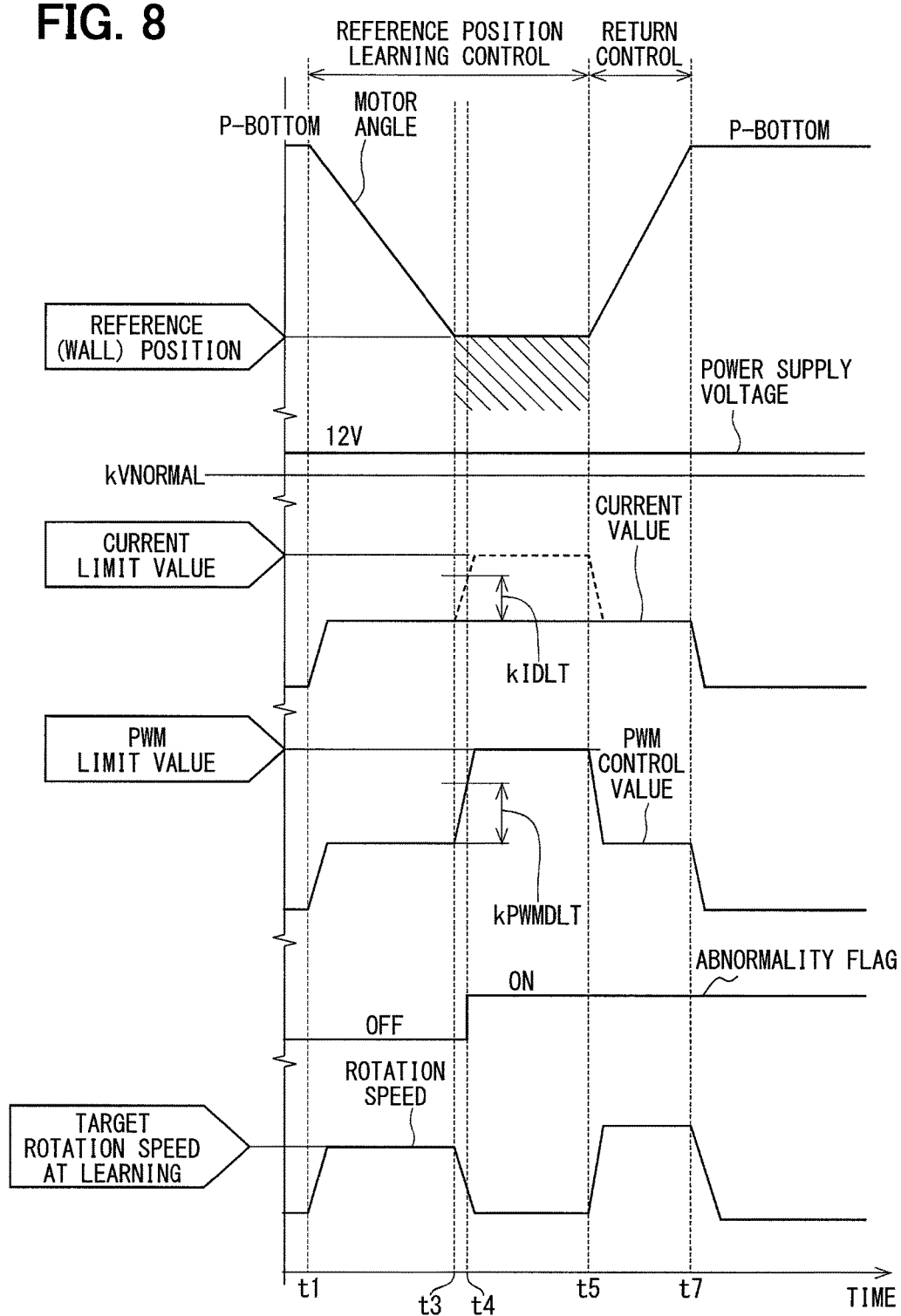
FIG. 8 is a time chart showing a further exemplary control performed by the shift range control apparatus according to the first embodiment.

FIG. 8 shows a further exemplary control performed by the control circuit 80 in case that the current detection circuit 74 is abnormal. In this example, the control circuit 80 does not execute S105 in the processing S100. As described with reference to the example shown in FIG. 7, since the current detection circuit 74 is abnormal, the PWM control value increases after time t3 but the current value detected by the current detection circuit 74 remains the same as before time t3.

The variation width of the PWM control value in the period from time t3 to time t4 is equal to or larger than the PWM variation width IPWMDLT and the variation width (0) of the current detected by the current detection circuit 74 at this time is smaller than the current variation width kIDLT, it is determined at S103 that the variation width of the PWM control value is equal to or larger than the PWM variation width kPWMDLT and the variation width of the current value detected by the current detection circuit 74 is smaller than the current variation width kILLT. Further it is determined at S106 that the relation between the current value detected by the current detection circuit 74 and the PWM control value is inappropriate. Since the power supply voltage at this time is 12V and equal to or larger than the predetermined value kVNORMAL, it is determined at S108 that the current detection circuit 74 is abnormal. Thus the abnormality flag is set to ON.

When it is determined at time t4 that the current detection circuit 74 is abnormal, the control circuit 80 limits the PWM control value by the PWM control value limitation part 86 without limiting the driving current by the current limitation part 85. As a result, after time t4, the PWM control value is limited by the PWM control value limitation part 86.

Figure 9:
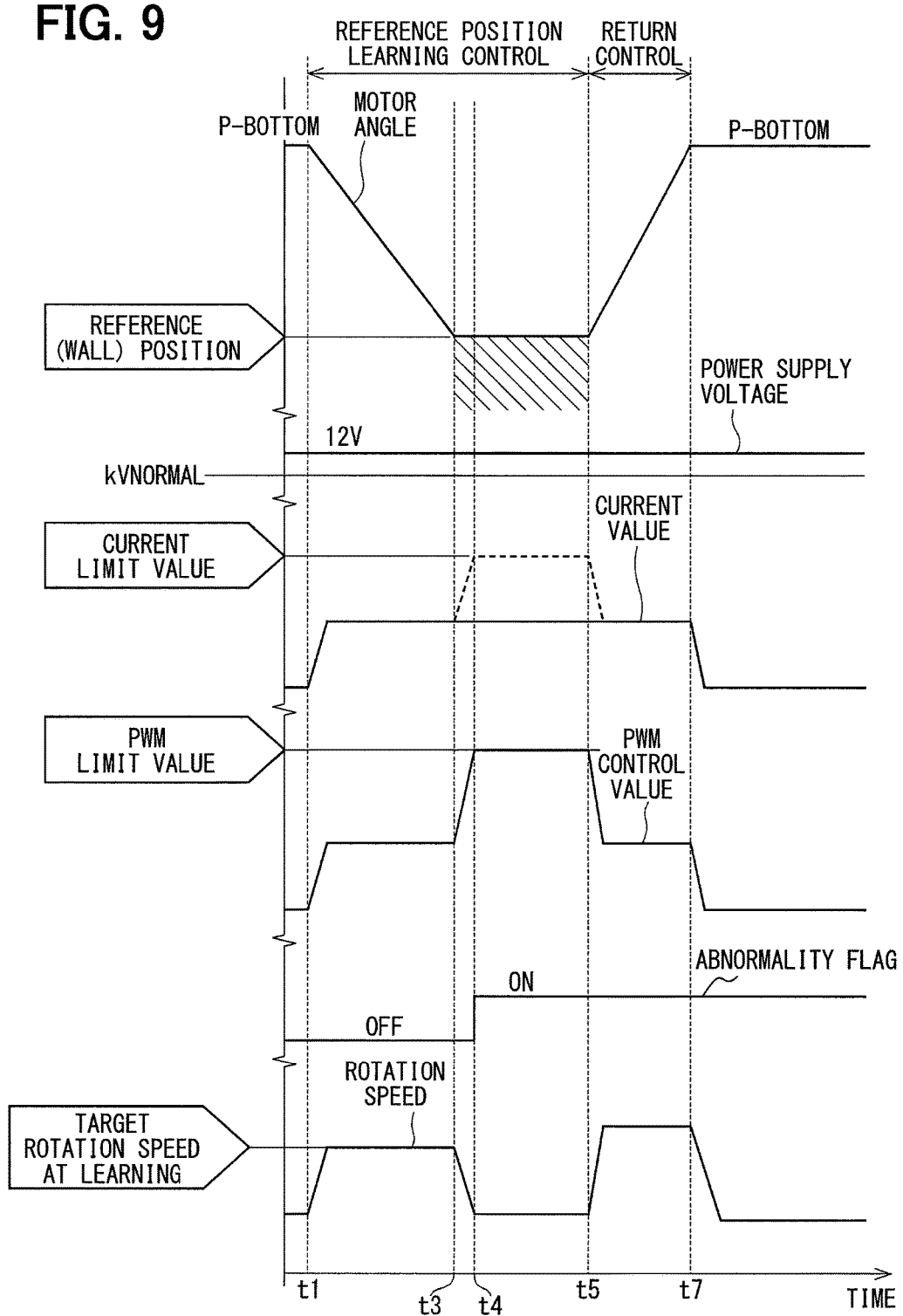
FIG. 9 is a time chart showing a still further exemplary control performed by the shift range control apparatus according to the first embodiment.

FIG. 9 shows a further exemplary control performed by the control circuit 80 in case that the current detection circuit 74 is abnormal. In this example, the control circuit 80 does not execute S103 and S105 in the processing S100. As described with reference to the example shown in FIG. 7, since the current detection circuit 74 is abnormal, the PWM control value increases after time t3 but the current value detected by the current detection circuit 74 remains the same as before time t3.

When the PWM control value reaches the PWM limitation value at time t4, it is determined at S102 that the PWM control value is equal to or larger than the PWM limitation value and the current detected by the circuit 74 is smaller than the current limitation value. It is further determined at S106 that the relation between the current value detected by the current detection circuit 74 and the PWM control value is inappropriate. Since the power supply voltage at this time is 12V and equal to or larger than the predetermined value kVNORMAL, it is determined at S108 that the current detection circuit 74 is abnormal. Thus the abnormality flag is set to ON.

When it is determined that the current detection circuit 74 is abnormal at time t4, the control circuit 80 limits the PWM control value by the PWM control value limitation part 86 without limiting the driving current by the current limitation part 85. As a result, after time t4, the PWM control value is limited by the PWM control value limitation part 86.

Figure 10:
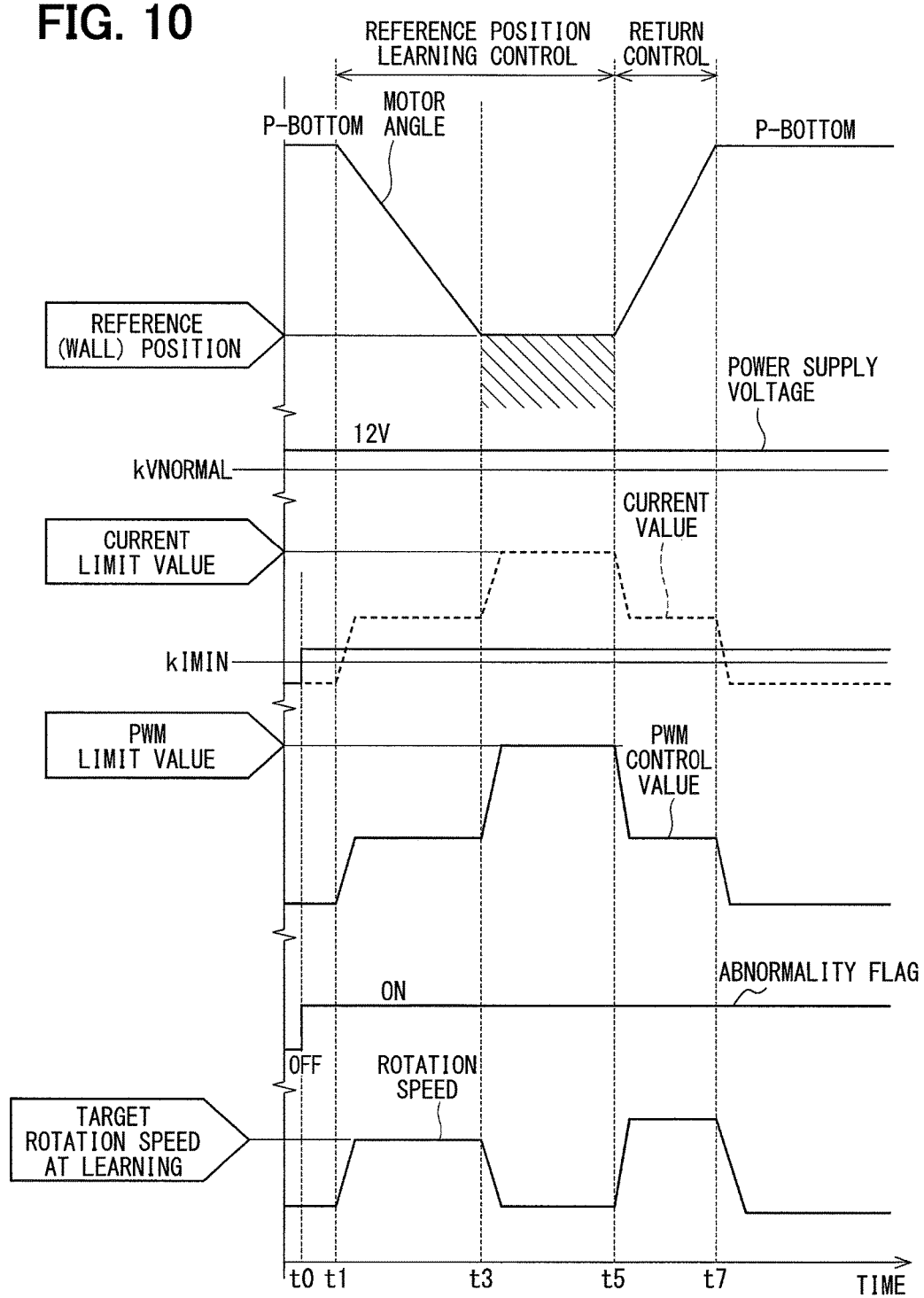
FIG. 10 is a time chart showing a still further exemplary control performed by the shift range control apparatus according to the first embodiment.

FIG. 10 shows a still further exemplary control performed by the control circuit 80 in case that the current detection circuit 74 is abnormal. Since the current detection circuit 74 is abnormal, the current value detected by the current detection circuit 74 increases to be larger than a check reference current value kIMIN. For this reason, it is determined at S104 that the PWM control value is 0 and the current value detected by the current detection circuit 74 is larger than the check current value kIMIN. It is further determined at S106 that the relation between the current value detected by the current detection circuit 74 and the PWM control value is inappropriate. Since the power supply voltage at this time is 12V and equal to or larger than the predetermined value kVNORMAL, it is determined at S108 that the current detection circuit 74 is abnormal. Thus the abnormality flag is set to ON.

When it is determined at time t0 that the current detection circuit 74 is abnormal, the control circuit 80 limits the PWM control value by the PWM control value limitation part 86 without limiting the driving current by the current limitation part 85. For this reason, after time to, the PWM control value is limited by the PWM control value limitation part 86. After time t1, since the motor 20 is controlled in the same way as when the current detection circuit 74 is normal (FIG. 6), no description is made.

As described above, according to the first embodiment, the ECU 60 is provided as the shift range control apparatus for switching over the shift range by controlling the shift range switchover device 30, which includes the motor 20 and the detent plate 32 rotationally driven by the torque of the motor 20. The ECU 60 has the following features in structure and operation.

The ECU 60 includes the current detection circuit 74 and the control circuit 80, which includes the PWM control part 81, the rotation speed control part 82, the rotation angle detection part 83, the reference position learning part 84, the current limitation part 85, the PWM control value limitation part 86 and the relation check part 87. The control circuit 80 switches over the shift range by controlling driving of the motor 20 to rotationally drive the detent plate 32. The PWM control part 81 rotationally drives the motor 20 based on the PWM control value, which is the control value for PWM-controlling the motor. The rotation speed control part 82 controls the rotation speed of the motor 20 by the PWM control part 81. The rotation angle detection part 83 detects the rotation angle of the motor 20.

The reference position learning part 84 controls the motor 20 to rotate at the constant rotation speed by the rotation speed control part 82 until the detent plate 32 stops at the limit position in the movable range, and learns the reference position of the motor 20 based on the rotation angle detected by the rotation angle detection part 83 when the motor 20 stops rotation. The current detection circuit 74 detects the current value corresponding to the driving current supplied when the motor 20 is driven.

The current limitation part 85 limits the current supplied to the motor 20 so that the current value detected by the current detection circuit 74 is limited to be equal to or smaller than the current limitation value, which is the predetermined value. It is thus possible to limit the torque of the motor 20 to be equal to or smaller than the predetermined value based on the current value detected by the current detection circuit 74 during the period, in which, for example, the reference position learning part 84 continues to control the motor 20.

The PWM control value limitation part 86 limits the PWM control value to be equal to or smaller than the PWM limitation value, which is the predetermined value. It is thus possible to limit the torque of the motor 20 to be equal to or smaller than the predetermined value during the period, in which, for example, the reference position learning part 84 continues to control the motor 20. The relation check part 87 checks whether the relation between the current value detected by the current detection circuit 74 and the PWM control value is inappropriate.

It is possible for the control circuit 80 to limit the torque of the motor 20 to be equal to or smaller than the predetermined value by limiting the PWM control value by the PWM control value limitation part 86 in case that the current detection circuit 74 is abnormal, for example, when the relation between the relation check part 87 determines that the current value detected by the current detection circuit 74 and the PWM control value is inappropriate. As a result, even when the current detection circuit 74 is abnormal, it is possible to limit the torque of the motor 20 appropriately in the period that the motor 20 is controlled by the reference position learning part 84 (FIG. 7 to FIG. 10).

In case that the brushless motor is used as the motor 20 of the shift range switchover apparatus 30, the torque of the motor 20 occasionally increases when the motor 20 stops rotation. According to the first embodiment, it is possible to appropriately limit the torque of the motor 20 while using the DC brushless motor as the motor 20 and improving the response characteristic.

The ECU 60 further includes the abnormality check part 88 for checking whether the current detection circuit 74 is abnormal based on the check result of the relation check part 87. The abnormality check part 88 determines that the current detection circuit 74 is abnormal in case that the voltage of the battery 2 for supplying the driving current to the motor 20 is equal to or larger than the predetermined voltage value kVNORMAL at time when the relation check part 87 determines that the relation between the current value detected by the current detection circuit 74 and the PWM control value is inappropriate.

In case that the relation check part 87 determines that the relation between the current value detected by the current detection circuit 74 and the PWM control value is inappropriate, it is likely that the relation is inappropriate because of the abnormality of the current detection part 74 when the voltage of the battery 2 for supplying the motor 20 with the driving current is equal to or larger than the predetermined voltage value. For this reason, the abnormality check part 88 determines that the current detection circuit 74 is abnormal.

The control circuit 80 limits the PWM control value by the PWM control value limitation part 86, when the abnormality check part determines that the current detection circuit 74 is abnormal. On the other hand, the control circuit 80 limits the current supplied to the motor 20 by the current limitation part 85 without limiting the PWM control value by the PWM control value limitation part 86, when the abnormality check part 88 determines that the current detection circuit 74 is normal. As a result, when the current detection circuit 74 is abnormal, it is possible to limit the torque by limiting the PWM control value by the PWM control value limitation part 86. Further, when the current detection circuit 74 is normal, it is possible to limit the torque of the motor 20 by limiting the current supplied to the motor 20 by the current limitation part 85, while reducing variation of the torque.

The relation check part 87 determines that the relation between the current value detected by the current detection circuit 74 and the PWM control value is inappropriate, when the PWM control value is equal to or larger than the PWM limitation value and the current value detected by the current detection circuit 74 is smaller than the current limitation value (FIG. 4 and FIG. 9).

The relation check part 87 determines that the relation between the current value detected by the current detection circuit 74 and the PWM control value is inappropriate, when the variation width of the PWM control value is equal to or larger than the predetermined PWM variation width kPWMDLT and the current value detected by the current detection part 74 is smaller than the predetermined current variation width kIDLT (FIG. 4 and FIG. 8). As a result, it is possible to check abnormality of the current detection circuit 74 based on relative change between the current value and the PWM control value.

The relation check part 87 corrects the predetermined current variation width kIDLT based on the voltage of the battery 2, which supplies the driving current to the motor 20, and checks the relation between the current value detected by the current detection circuit 74 and the PWM control value (FIG. 5). As a result, it is possible to check the abnormality of the current detection circuit 74 accurately by correcting with the voltage of the battery 2, on which a degree of relative variation between the current value and the PWM control value depends.

The relation check part determines that the relation between the current value detected by the current detection circuit 74 and the PWM control value is inappropriate, when the PWM control value is 0 and the current value detected by the current detection circuit 74 is larger than the predetermined check current value kIMIN (FIG. 4 and FIG. 10). As a result, it is possible to check whether the current detection circuit 74 is abnormal before starting the reference position learning control.

The relation check part 87 determines that the relation between the current value detected by the current detection circuit 74 and the PWM control value is inappropriate, when the PWM control value is equal to or larger than the predetermined PWM reference value kPWM and the current value detected by the current detection circuit 74 is equal to or smaller than the predetermined current reference value kI (FIG. 4 and FIG. 7). As a result, it is possible to determine that the current detection circuit 74 is abnormal when the current value deviates excessively from the PWM control value.

Second Embodiment

Figure 11:
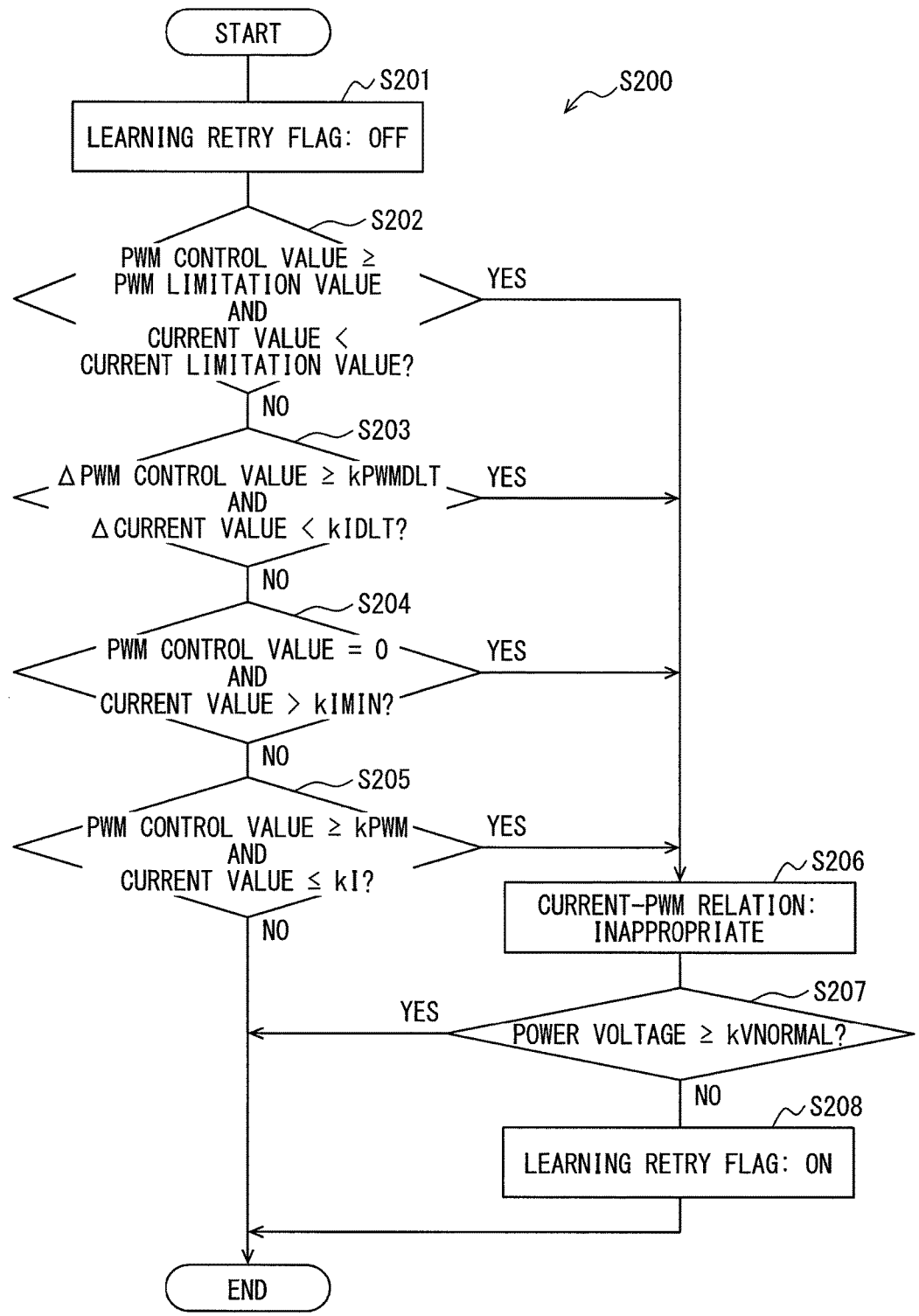
FIG. 11 is a flowchart showing processing executed by the control circuit of the shift range control apparatus according to a second embodiment.

The shift range control apparatus (ECU 60) according to a second embodiment will be described with reference to FIG. 11. The second embodiment is different from the first embodiment in processing, which is execute after the processing of the relation checking executed by the relation check part 87 of the control circuit 80.

In the second embodiment, the control circuit 80 has no abnormality check part 88. In the second embodiment, a series of processing S200 shown in FIG. 11 is executed by the relation check part 87 and the like of the control circuit 80. The processing S200 is started to be executed before the reference position learning part 84 starts controlling the motor 20 by the reference position learning part 84 and repeated during a period the reference position learning part 84 controls the motor 20. When the processing S200 is started, S201 is executed.

At S201, the control circuit 80 sets a learning retry flag, which indicates whether the reference position leaning control is retried, is set to OFF. When the leaning retry flag is OFF, the reference position learning is not performed again. When the leaning retry flag is ON, the reference position learning is performed again. S202 to S205 are the same as S102 to S105 and hence not described. When any one of S202 to S205 results in YES, S206 is executed. At S206, the control circuit 80 determines that the relation between the current value detected by the current detection circuit 74 and the PWM control value is inappropriate. Then S207 is executed.

At S207, the control circuit 80 checks whether the voltage of the battery 2 is equal to or larger than the voltage value kVNORMAL. The voltage value kVNORMAL is the predetermined value. When it is determined that the voltage of the battery 2 is equal to or larger than the voltage value kVNORMAL (S207: YES), the processing of S200 is finished. When it is determined that the voltage of the battery 2 is smaller than the voltage value kVNORMAL (S207: NO), S208 is executed. At S208, the control circuit 80 sets the learning retry flag to ON. Then the processing of S200 is finished. When the learning retry flag is ON at the time of finishing of the processing S200, the control circuit 80 retries the reference position learning by the reference position learning part 84.

As described above, the control circuit 80 performs the function of the relation check part 87 by execution of S202 to S206. In case that the power supply voltage is smaller than the predetermined voltage value when it is determined by the relation check part 87 that the relation between the current detected by the current detection circuit 74 and the PWM control value is inappropriate, it is likely that the current detection circuit 74 is not abnormal but the relation is determined to be inappropriate because of a temporary fall of the power supply voltage. The control circuit 80 therefore tries to perform learning of the reference position by the reference position learning part 84 again.

According to the second embodiment, the control circuit 80 retries learning of the reference position by the reference position learning part 84 in case that the voltage of the battery 2 for supplying the driving current to the motor 20 is smaller than the predetermined voltage value at time when the relation check part 87 determines that the relation between the current value detected by the current detection circuit 74 and the PWM control value is inappropriate. As a result, it is possible to perform the reference position learning control again, even in case that the voltage of the battery 2 temporarily falls because of cranking of an engine in the vehicle and the like and the relation between the current value detected by the current detection circuit 74 and the PWM control value is determined to be inappropriate in the period of the reference position learning control. It is thus possible to perform the normal driving control normally.

Other Embodiment

As the other embodiment of the shift range control apparatus, the control circuit 80 may execute one of S102 to S105 in the processing S100. S102 to S105 may be executed in different orders. The control circuit 80 may execute at least one of S202 to S205 in the processing S200. S202 to S205 may be executed in different orders.

As the other embodiment of the shift range control apparatus, the first embodiment and the second embodiment may be combined. For example, in case that S206 results in YES in the second embodiment, the current detection circuit 74 may be determined to be abnormal by executing S106 of the first embodiment and setting the abnormality flag to ON.

In the embodiments described above, it is exemplified that all of the PWM control part 81, the rotation speed control part 82, the rotation angle detection part 83, the reference position learning part 84, the current limitation part 85, the PWM control value limitation part 86, the relation check part 87 and the abnormality check part 88 are provided as functional parts of the control circuit 80, that is, all of the functions of those parts 81 to 88 are performed by execution of control programs. As the other embodiment, any one of the PWM control part 81, the rotation speed control part 82, the rotation angle detection part 83, the reference position learning part 84, the current limitation part 85, the PWM control value limitation part 86, the relation check part 87 and the abnormality check part 88 may be configured as a hardware part such as dedicated electronic circuits or the like.

In the embodiments described above, it is exemplified that the P-wall 411 of the recessed part 41 and the D-wall 441 of the recessed part 44 are configured in a shape, which does not allow the roller 35 to override even when the detent plate 32 rotates. As the other embodiment, the P-wall 411 and the D-wall 441 may be configured in a shape, which allows the roller 35 to override when the detent plate 32 rotates. In this modification, the movable range of the detent plate 32 is limited to be between two walls by additionally providing such two walls, which contact both end parts of the detent plate 32 in the rotation direction and are capable of limiting the rotation of the detent plate 32. In the reference position learning control in this modification, the reference position is learned by pushing both ends of the detent plate 32 in the rotation direction to at least one of two walls.

In the embodiments described above, it is exemplified that the detent mechanism is formed of the plural recessed parts formed in the detent plate (driven target) provided on the manual shaft and the roller of the detent spring. As the other embodiment, the detent mechanism formed of plural recessed parts and the roller may be provided near the speed reduction device within the actuator, for example. Further, as far as it is possible to hold the rotation position of the driven target at the predetermined position, the detent mechanism may be configured differently from the combination of the recessed part and the roller.

The number of the recessed parts may be any number. That is, the number of shift ranges of the automatic transmission, to which the shift range control apparatus (ECU 60) is applied, is not limited to four.

As the other embodiment, the shift range control apparatus may be applied to a continuously variable transmission (CVT), which switches over four positions of P, R, N and D similarly to the embodiments described above, or an automatic transmission of a hybrid vehicle (HV). Further, the shift range control apparatus may be applied to an electric vehicle (EV), in which two positions of P and non-P are switched over or to a range switchover of a parking mechanism of the hybrid vehicle. As the other embodiment, the motor may be a type, which has coils of four or more phases, for example.

In the embodiments described above, it is exemplified that the encoder for detecting the relative rotation position of the motor is the magnetic type encoder. As the other embodiment, the encoder may be an optical type or a brush type, for example. The encoder is exemplified to output the pulse signals of A-phase and B-phase. The encoder may, however, further output a Z-phase signal for use in correction (for indexing) in addition to the A-phase and B-phase. In place of the encoder, any other detection devices may be used as far as it is capable of detecting the rotation position of the motor.

The shift range control apparatus described above should not be limited to the disclosed embodiments and modifications but may be further modified and varied.

What is claimed is:

1. A shift range control apparatus for switching over a shift range by controlling a shift range switchover device, which includes a motor and a driven target rotationally driven by torque of the motor, the shift range control apparatus comprising:

a PWM control part for rotationally driving the motor based on a PWM control value, which is a pulse-width modulation control value for controlling the motor by pulse-width modulation;

a rotation speed control part for controlling a rotation speed of the motor by the PWM control part;

a rotation angle detection part for detecting a rotation angle of the motor;

a reference position learning part for controlling the motor to rotate at a constant rotation speed by the rotation speed control part until the driven target stops at a limit position in a movable range, and learning a reference position of the motor based on the rotation angle detected by the rotation angle detection part when the motor stops rotation;

a current detection part for detecting a current value corresponding to a driving current supplied when the motor is driven;

a current limitation part for limiting a current supplied to the motor so that the current value detected by the current detection circuit is limited to be equal to or smaller than a predetermined current limitation value;

a PWM control value limitation part for limiting the PWM control value to be equal to or smaller than a predetermined PWM limitation value; and a relation check part for checking whether a relation between the current value detected by the current detection circuit and the PWM control value is inappropriate by checking whether the current detected by the current detection circuit is within a predetermined rang, which is determined in relation to the PWM control value.

2. The shift range control apparatus according to claim 1, further comprising:
an abnormality check part for checking whether the current detection circuit is abnormal based on a check result of the relation check part,
wherein the abnormality check part determines that the current detection circuit is abnormal in case that a voltage of a power supply source for supplying the driving current to the motor is equal to or larger than a predetermined voltage value at time when the relation check part determines that the relation between the current value detected by the current detection circuit and the PWM control value is inappropriate.

3. The shift range control apparatus according to claim 2, wherein:
the PWM control value limitation part limits the PWM control value, when the abnormality check part determines that the current detection circuit is abnormal; and
the current limitation part limits the current supplied to the motor without limiting the PWM control value by the PWM control value limitation part, when the abnormality check part determines that the current detection circuit is normal.

4. The shift range control apparatus according to claim 1, wherein:
the reference position learning part retries learning of the reference position in case that the voltage of the power supply source for supplying the driving current to the motor is smaller than a predetermined voltage value at time when the relation check part determines that the relation between the current value detected by the current detection circuit and the PWM control value is inappropriate.

5. The shift range control apparatus according to claim 1, wherein:
the relation check part determines that the relation between the current value detected by the current detection circuit and the PWM control value is inappropriate, when the PWM control value is equal to or larger than the predetermined PWM limitation value and the current value detected by the current detection circuit is smaller than the predetermined current limitation value.

6. The shift range control apparatus according to claim 1, wherein:
the relation check part determines that the relation between the current value detected by the current detection circuit and the PWM control value is inappropriate, when a variation width of the PWM control value is equal to or larger than a predetermined PWM variation width and the current value detected by the current detection part is smaller than a predetermined current variation width.

7. The shift range control apparatus according to claim 6, wherein:
the relation check part varies the predetermined current variation width based on the voltage of the power supply source, which supplies the driving current to the motor, and checks the relation between the current value detected by the current detection circuit and the PWM control value.

8. The shift range control apparatus according to claim 1, wherein:
the relation check part determines that the relation between the current value detected by the current detection circuit and the PWM control value is inappropriate, when the PWM control value is 0 and the current value detected by the current detection circuit is larger than a predetermined check current value.

9. The shift range control apparatus according to claim 1, wherein:
the relation check part determines that the relation between the current value detected by the current detection circuit and the PWM control value is inappropriate, when the PWM control value is equal to or larger than a predetermined PWM reference value and the current value detected by the current detection circuit is equal to or smaller than a predetermined current reference value.

* * * * *